United States Patent
Monroe

(10) Patent No.: US 6,869,104 B2
(45) Date of Patent: Mar. 22, 2005

(54) MOTORIZED ADJUSTMENT OF SEAT BELT ANCHOR POSITION

(75) Inventor: Keith V Monroe, Brownstown, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/361,101

(22) Filed: Feb. 6, 2003

(65) Prior Publication Data

US 2004/0155450 A1 Aug. 12, 2004

(51) Int. Cl.$^7$ .............................................. B60R 22/20
(52) U.S. Cl. .................................................. 280/801.2
(58) Field of Search ........................... 280/801.2, 808, 280/735

(56) References Cited

U.S. PATENT DOCUMENTS

| | | | |
|---|---|---|---|
| 4,695,076 A | * 9/1987 | Hane | 280/804 |
| 4,807,715 A | 2/1989 | Nagashima et al. | |
| 5,163,707 A | * 11/1992 | Watanabe et al. | 280/801.2 |
| 5,261,698 A | * 11/1993 | Yano | 280/808 |
| 5,265,908 A | * 11/1993 | Verellen et al. | 280/801.2 |
| 5,333,905 A | * 8/1994 | Watanabe | 280/801.2 |
| 5,566,978 A | * 10/1996 | Fleming et al. | 280/801.2 |
| 5,615,917 A | * 4/1997 | Bauer | 280/806 |
| 5,641,146 A | 6/1997 | Hoshihara et al. | |
| 5,743,597 A | * 4/1998 | Jessup et al. | 297/474 |
| 6,016,985 A | 1/2000 | Sung | |
| 6,276,721 B1 | 8/2001 | Romeo | |
| 6,336,656 B1 | 1/2002 | Romeo | |

FOREIGN PATENT DOCUMENTS

DE          4409046 A1 * 9/1995 ........... B60R/16/02

* cited by examiner

Primary Examiner—Faye M. Fleming
(74) Attorney, Agent, or Firm—Thomas A. Jurecko

(57) ABSTRACT

An apparatus and method are provided for adjusting the position of a movable seat belt through the use of a motor operatively attached to the movable seat belt anchor, and a controller operatively connected to the motor for providing a motor drive signal to the motor for moving the seat belt anchor. The controller includes a memory for storing one or more desired positions of the anchor.

10 Claims, 2 Drawing Sheets

MOTORIZED ADJUSTMENT OF SEAT BELT ANCHOR POSITION

TECHNICAL FIELD OF THE INVENTION

This invention relates to occupant restraint systems for vehicles, and more particularly adjustment of movable anchors attaching seat belts to a vehicle.

BACKGROUND OF THE INVENTION

It is common practice in vehicles, such as automobiles and trucks, to provide a seat belt 10, such as the one shown in FIG. 1, attached to a B-pillar 12 or other structure of the vehicle, for restraining the occupant of a seat in the seat in the event of a collision or a roll-over of the vehicle.

One widely used form of a seat belt 10 includes an extensible section 14 of the belt 10, attached at an upper end thereof through a first seat belt anchor 16 and at a lower end thereof to a second seat belt anchor 18 to the B-pillar 12 of the vehicle at a point on the B-pillar 102 near the floor of the vehicle. The second anchor 18 typically includes a tension reel mechanism for retracting and storing excess length of the extensible section 14 of the belt 10, and locking the belt 10 in place upon impact of the vehicle with another object.

The extensible section 14 of the belt 10 includes a sliding tang 20 that engages a buckle 22 attached to a non-extensible section 24 of the belt 10, that is attached to the floor of the vehicle by a third seat belt anchor 26. When the tang 20 is latched into the buckle 22, the extensible section 14 of the belt 10 defines a lap belt portion 28 extending from the second anchor 18 to the buckle 22, and a torso belt portion 30 extending over the occupant's shoulder from the first anchor 16 to the buckle 22.

As shown in FIG. 2, to provide for the comfort and safety of occupants of different sizes in a vehicle having a seat belt 10 of the type depicted in FIG. 1, the first seat belt anchor 16 often includes manually operable features that allow it to be moved on the B-pillar 12. By depressing release buttons 32, the anchor 16 is released for limited movement in a track 34 attached to the B-pillar 12, so that the upper anchor 16 can be moved up or down a limited distance to a desired position of the anchor 16 selected by the occupant. After the anchor 16 is moved to the desired position, the release buttons 32 are released, and the anchor 16 locks into the track 34 at the desired position.

Although manually operable, movable anchor mechanisms, of the type described in the preceding paragraph, allow the position of the anchor 16 to be moved, it is often difficult for occupants to reach back over their shoulder to depress the release buttons 32. This is particularly true for occupants of short stature, who have positioned the seat at a forward position away from the B-pillar 12. Occupants wearing heavy clothing, or whose range of motion is restricted also may find it difficult to reach back and operate the movable anchor 14.

In addition, the need for repetitively re-adjusting the position of the anchor 14 each time a different occupant enters the vehicle, or to accommodate devices such as infant seats, is unnecessarily bothersome where the same group of occupants all regularly use the vehicle, but may be alternatively seated in the driver's seat or one of the passenger seats.

What is needed, therefore, is an improved restraint system having a more convenient apparatus and method for adjusting a movable seat belt anchor to a desired position.

SUMMARY OF THE INVENTION

The invention provides an improved apparatus for adjusting the position of a movable seat belt through the use of a motor operatively attached to the movable seat belt anchor, and a controller operatively connected to the motor for providing a motor drive signal to the motor for moving the seat belt anchor. The controller may include a memory for storing a desired position of the anchor.

In one form of the invention, a restraint system for a vehicle seat in a vehicle is provided. The restraint system includes a seat belt anchor movably mounted to the vehicle, and an apparatus having a motor operatively attached to the movable seat belt anchor for adjusting the position of a movable seat belt anchor. The restraint system may include a controller operatively connected to the motor for providing a motor drive signal to the motor for moving the seat belt anchor to a desired position. The controller may include an input element for sending a signal indicative of the desired position to the controller. The restraint system may also include a memory for storing a desired position of the anchor. The input element may generate a signal including an indicator signal designating a desired position of the anchor stored in the memory.

The invention also provides a method for adjusting the position of a movable seat belt anchor in a vehicle, by operatively attaching a motor to the anchor for moving the anchor, and moving the anchor with the motor.

The foregoing and other features and advantages of the invention will become further apparent from the following detailed description of exemplary embodiments, read in conjunction with the accompanying drawings. The detailed description and drawings are merely illustrative of the invention rather than limiting, the scope of the invention being defined by the appended claims and equivalents thereof.

DETAILED DESCRIPTION

Figure 1:
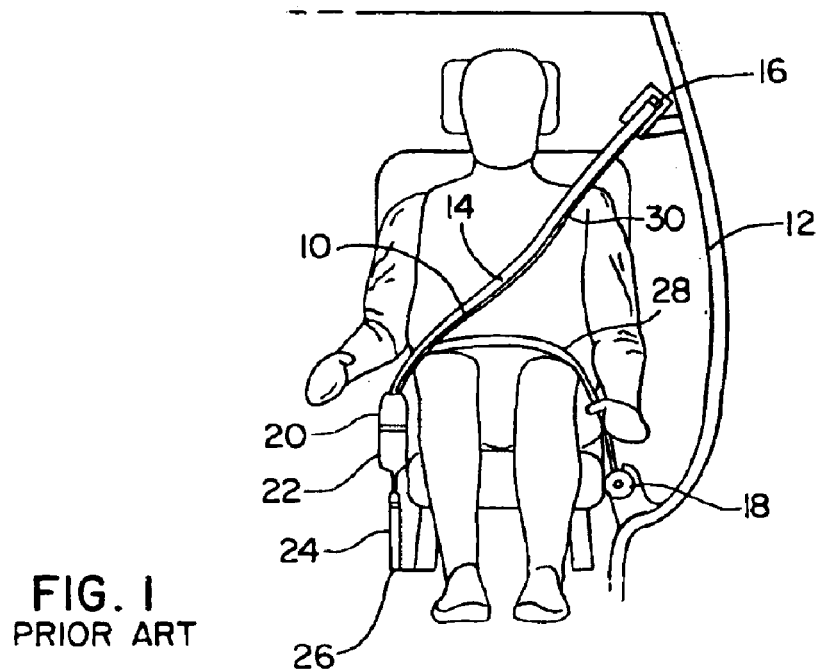
FIG. 1 is a schematic representation of a typical seat belt restraint system for a vehicle, having a seat belt anchored to a B-pillar of the vehicle with an adjustable anchor.
Figure 2:
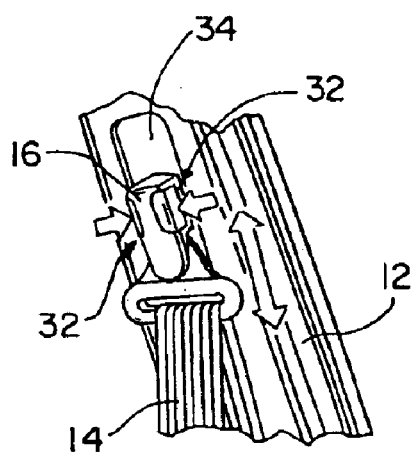
FIG. 2 is a perspective view of the adjustable anchor of FIG. 1.
Figure 3:
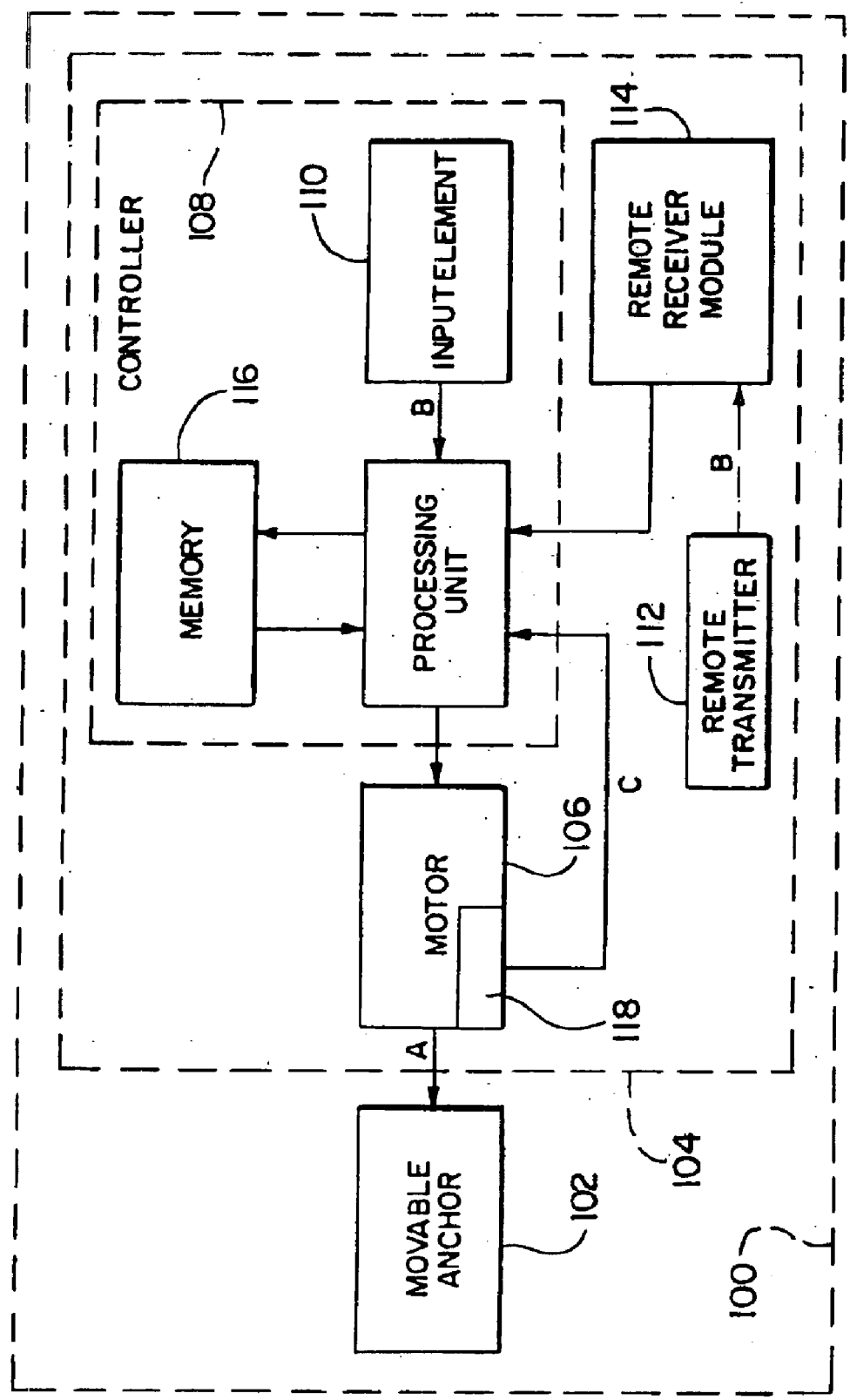
FIG. 3 is schematic representation of an exemplary embodiment of a restraint system for a vehicle seat in a vehicle, according to the invention.

FIG. 3 depicts an exemplary embodiment of a restraint system 100 for a vehicle seat in a vehicle. The restraint system 100 includes a seat belt anchor 102 movably mounted to the vehicle, and an apparatus 104 having a motor 106 operatively attached to the movable seat belt anchor 102 for adjusting the position of a movable seat belt anchor 102.

A controller 108 is operatively connected by a drive mechanism to the motor 106 for providing a motor drive signal 'A' to the motor 106 for moving the seat belt anchor 102 to a desired position. The controller 108 includes an input element 110 for sending a desired position signal 'B' indicative of the desired position for the anchor 102 to the controller 108. The input element 110 may take many forms, such as a switch, a keypad, or a touch screen mounted within the vehicle in a convenient location such as the dashboard, a center console, a door panel, or an overhead console. The input element 110 may also take the form of a remote transmitter 112, interfacing with the controller through a remote receiver module 114.

The restraint system 100 includes a memory 116 for storing a desired position of the anchor 102. In the exemplary embodiment shown in FIG. 3, the memory is part of the controller 108. In other embodiments of the invention, the memory 108 may be more advantageously located remote from the controller 108, or shared with another on-board computational system of the vehicle.

When a restraint system 100 according to the invention incorporates a memory 116, as in the system 100 shown in FIG. 3, the desired position signal 'B' generated by the input element 110, and remote transmitter 112 includes an indicator signal designating a particular desired position of the anchor 102 stored in the memory. The indicator signal can be a unique keystroke input designating an occupant for whom a desired position of the anchor 102 has previously been stored in memory, or can be a signal unique to a particular input device 110 or remote transmitter 112 designating a particular occupant, or for which seat in the vehicle a change in anchor position is being commanded.

Where multiple desired positions are stored in the memory 116, each is associated with a unique indicator signal, and the controller 108 selects the desired position from memory 116 corresponding to the unique indicator signal received from the input element 110, 112. In a vehicle including multiple seats, each having a movable anchor 102 driven by a separate motor 106 attached to the controller 108, the controller 108 provides a unique motor drive signal 'A' to one of the motors 106 for driving the motor 106 to position the movable anchor 102 attached to that motor 106 to the desired position designated by the unique indicator signal.

Preferably each input element 110 or remote transmitter 112 operatively connected to the controller 108 is configured to emit a unique identifier code to the controller 108 designating for which seat in the vehicle the controller 108 is to move the movable anchor 102, so that a person carrying a particular remote transmitter 112, for example, can designate at a distance for which seat they would like the anchor 102 adjusted to match their particular desired position as stored in memory 116.

The controller 108 is adapted for receiving a present position signal "C" designating the present position of the anchor 102, and storing data representing the present position of the anchor 102 in the memory 116. In the exemplary embodiment, shown in FIG. 3, the motor 106 includes an anchor position sensor 118. In other embodiments of the invention, however, it may be advantageous to incorporate the position sensor 118 in another location, such as in the movable anchor 102, for example. The position sensor 118 is operatively attached to the both the anchor 102 and the controller 116, for sensing the present position of the anchor 102 and sending the present position signal "C" to the controller 108.

To initially set the desired positions in memory 116, the input element 110 is used to control the motor 106 in a manner that drives the anchor to a present position that the occupant desires to have stored in memory 116, for later automatic recall by merely sending the unique identifier code to the controller 116, using the input element 110 or the remote transmitter 112. Once the desired present position has been established, the input element 110 is used for setting the desired position into memory, together with a unique identifier code associated with that particular desired position. It is also contemplated that it may be advantageous to pre-program standardized anchor positions into the memory of certain embodiments of the invention for specialized circumstances, such as pre-set anchor positions for seat belts in seats in which the occupant may be riding in a child safety seat, or anchor positions in paraplegic vans used for securing a wheel chair.

The present position signal "C" is also used in the exemplary embodiment to provide a closed loop feedback to the controller 108. The controller 108 continuously compares the present position signal "C" to the desired position signal "B," and terminates the motor drive signal "A" when the present position signal "C" matches the desired position signal "B" for the anchor 102.

While the embodiments of the invention disclosed herein are presently considered to be preferred, various changes and modifications can be made without departing from the spirit and scope of the invention. For example, other embodiments of the invention may include multiple motors driving a given anchor, to thereby provide additional degrees of freedom of adjustment of the anchor position.

The scope of the invention is indicated in the appended claims, and all changes or modifications within the meaning and range of equivalents are intended to be embraced therein.

What is claimed is:

1. An apparatus for adjusting the position of a movable seat belt anchor, the apparatus comprising:
   a motor operatively attached to the movable seat for providing a motor belt anchor; and
   a controller operatively connected to the motor drive signal to the motor for moving the seat belt anchor, the controller includes a processing unit operatively connected to the motor and an input element for indicating a positional command to the controller, the input element is operatively connected to the processing unit, and wherein the motor includes an anchor position sensor operatively attached to the anchor and the controller for the present position of the anchor and sending the present position signal the controller.

2. An apparatus for adjusting the position of a movable seat belt anchor, the apparatus comprising:
   a motor operatively attached to the movable seat belt anchor, and
   a controller operatively connected to the motor for providing a motor drive signal to the motor for moving the seat belt anchor in a vertical direction on a vehicle pillar to adjust a position of the seat belt anchor, the controller includes a memory for storing a position of the anchor and is adapted for receiving a present position signal designating the present position of the anchor and storing data representing the present position of the anchor as a desired position of the anchor and storing a desired position indicator linked to the desired position of the anchor in the memory.

3. The apparatus of claim 2 wherein the input element is adapted for generating a signal including the desired position indicator.

4. The apparatus of claim 2 wherein the control is further adapted for:
   receiving a desired position signal including the stored desired position indicator; and
   sending the motor drive signal to the motor for driving the motor to move the anchor to the desired position corresponding to the stored desired position indicator.

5. The apparatus of claim 4 wherein the motor includes an anchor position sensor operatively attached to the anchor and the controller for sensing the present position of the anchor and sending the present position signal to the controller, and wherein the controller compares the present position signal to the desired position signal and terminates the motor drive signal when the present position signal matches the desired position signal for the anchor.

6. A restraint system for a vehicle seat in a vehicle, the restraint system comprising:
   a seat belt anchor movably mounted to the vehicle;
   an apparatus having a motor operatively attached to the movable seat belt anchor for adjusting the position of a movable seat belt anchor in a vertical direction on a vehicle pillar; and
   a controller operatively connected to the motor for providing a motor signal to the motor for moving the seat belt anchor to a desired position, the controller including an input element for sending a signal indicative of the desired position to the controller and a memory for storing a desired position of the anchor, wherein the input element generates a signal including an indicator signal designating a desired position of the anchor stored in the memory.

7. The restraint system of claim 6 wherein multiple desired positions are stored in the memory, each associated with a unique indicator signal, and the controller selects the desired position from memory designated by the unique indicator signal.

8. The restraint system of claim 7 wherein the vehicle includes multiple seats, each having a movable anchor driven by a separate motor attached the controller, and the controller provides a unique motor drive signal to one of the motors for driving the motor to position the movable anchor attached to that motor to the desired position design by the unique indicator signal.

9. The restraint system of claim 8 further comprising multiple input elements operatively connected to the controller, each input element sending a unique identifier code to the controller designating for which seat in the vehicle the controller is to move the movable anchor.

10. A method for adjusting the position of a movable seat belt anchor in a vehicle, the method comprising
    operatively attaching a motor to the seatbelt anchor for moving the anchor;
    storing in a memory a desired position of the anchor corresponding to a preferred position of the anchor when the seat belt is restraining a child safety seat; and
    moving the anchor with the motor in a vertical direction on a vehicle pillar to the desired position stored in memory.

* * * * *